United States Patent [19]
Chen

[11] Patent Number: 5,486,371
[45] Date of Patent: Jan. 23, 1996

[54] METHOD FOR COOKING FOOD WITH HEAT ENERGY GENERATED FROM NATURAL STONE MATERIALS

[76] Inventor: Chung-Te Chen, 58, Ma Yuan West St., Taichung, Taiwan

[21] Appl. No.: 311,949

[22] Filed: Sep. 26, 1994

[51] Int. Cl.$^6$ .................................. A23L 1/00; F24J 1/00
[52] U.S. Cl. .............. 426/510; 126/263.05; 126/263.08; 126/263.09; 426/109; 426/523
[58] Field of Search ..................................... 426/109, 113, 426/114, 510, 523; 126/263.05, 263.06, 263.07, 263.08, 263.09

[56] References Cited

U.S. PATENT DOCUMENTS

| | | | |
|---|---|---|---|
| 4,501,259 | 2/1985 | Apellaniz | 426/113 |
| 4,741,324 | 5/1988 | Ina et al. | 126/263.06 |
| 4,867,131 | 9/1989 | van der Merwe et al. | 426/114 |

*Primary Examiner*—George Yeung

[57] ABSTRACT

A method for utilizing heat energy for cooking food includes preparing two stone materials having more than 55.5% of Calcium Oxide, and mixing the stone materials with salt and calcium chloride of different portions and heating the stone materials gradually and rapidly so as to form a slow and a fast heating materials. The slow and fast heating materials are crushed and mixed together so as to form a final heating material. The final heating material is mixed with water so as to generate steam in order to cook food.

4 Claims, 2 Drawing Sheets

METHOD FOR COOKING FOOD WITH HEAT ENERGY GENERATED FROM NATURAL STONE MATERIALS

BACKGROUND OF THE INVENTION

1. Field of the Invention

The present invention relates to a method for utilizing heat energy, more particularly to a method for utilizing and controlling heat energy releasing from natural stone material in order for cooking food.

2. Description of the Prior Art

Typically, lime or calcined lime is used for generating heat in order for cooking purposes when blending or mixing with water. However, it takes a long time to reach the highest temperature. The heat energy has not been used for cooking food. In addition, the highest temperature thereof is not good enough for cooking food.

The present invention has arisen to mitigate or obviate the afore-described disadvantages of the conventional methods for cooking food.

SUMMARY OF THE INVENTION

The primary objective of the present invention is to provide a method for suitably cooking food.

In accordance with one aspect of the invention, there is provided a method for cooking food, the method comprising preparing a first and a second stone materials each of the first and the second stone materials including at least 55.5% of Calcium Oxide, mixing the first and second stone materials with coal and salt of different quantity, heating the first and second stone materials gradually and rapidly so as to form a slow and a fast heating material respectively, crushing and mixing the slow and the fast heating material so as to form a final heating material, and mixing the crushed slow and fast heating materials with water so as to generate steam in order to cook food.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
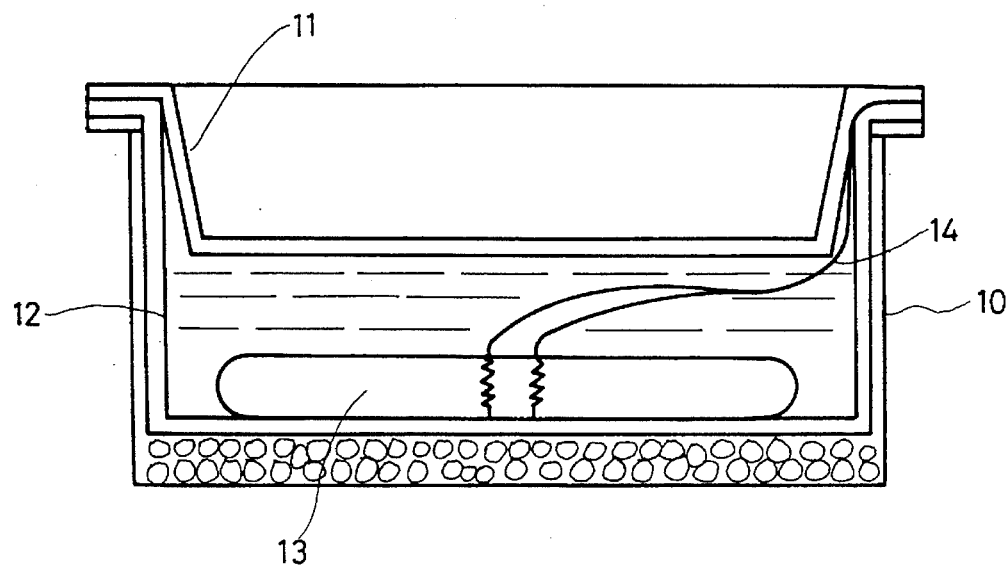
FIG. 1 is a cross sectional view illustrating the method in accordance with the present invention.

As shown in FIG. 1, a method in accordance with the present invention is provided for cooking food. The method uses stone material which may absorb heat energy up to 1250° C., which comprises at least 55.5% of Calcium Oxide, and which includes fewer than 5% of impurities. The stone material is easily available and can be treated with different processes in order to form different heating materials.

One of the heating material is treated as follows. Mix 90% of the stone material, 3% of salt (sodium chloride) and 7% of calcium chloride together, and dispose the same within a stove of 250° C., and then heat rapidly from 250° C. to 1250° C. for 15 minutes so as to form a fast heating material.

The other heating material is treated as follows. Mix 88% of stone material, 2% of salt (sodium chloride) and 10% of calcium chloride together, heat gradually from 20° C. to 1000° C. for 25 minutes so as to form a slow heating material.

The two different heating materials are then crushed into grains. Finally, 20% of the fast heating material and 80% of the slow heating material are packaged together so as to form the final heating material.

When the final heating material is mixed with water, the following different heating processes may be generated:

When the final heating material is mixed with water, the fast heating material will react with the water and may generate steam in order to release heat energy and in order to heat the water. The heated water may be mixed and reacted with the slow heating material, and the slow heating material will generate steam in order to release heat energy and in order to further heat the water. The heating materials may not be reacted with water completely in the beginning such that a portion of both the fast and the slow heating materials may be remain unreacted and may be reacted with steam and with the heated water lately. This portion of heating materials may absorb steam and may generate heat to the highest temperature. The fast heating material is primarily provided for catalysis purposes, and the slow heating material is primarily provided to generate heat. The proportion of the heating material to water is about 1:0.9.

It is to be noted that the reaction will not be completed if water is not enough. However, if water is too much, the heat energy may be absorbed by the water such that the temperature may not reach the required value. The speed of reaction will be increased when the water is heated. No catalyzer or other chemical material is added into the heating materials such that the releasing steam will not include any harmful or noxious materials.

As shown in FIG. 1, in use, a receptacle 12 is disposed within a container 10 and contains water and a box 13 for accommodating the final heating material. A dish 11 is disposed within the receptacle 12 for containing the food to be cooked. The box 13 includes two slits each having a thread 14 engaged therein so as to seal the box 13. The thread 14 includes one end extended outside the container 10 such that the thread 14 can be pulled to open the box 13, the final heating material accommodated in the box 13 may be mixed with water contained in the receptacle 12 when the thread 14 is pulled outward of the container 10. The final heating material then generates steam according to the three heating period as described above.

Figure 2:
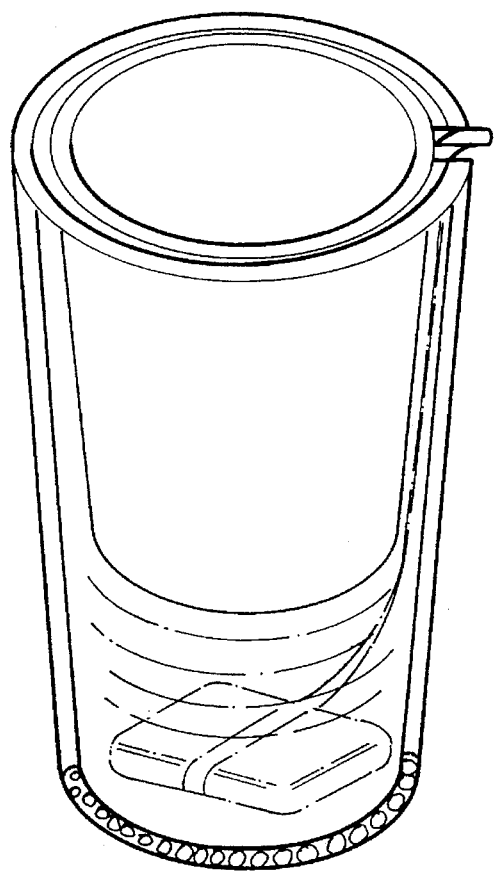
FIG. 2 is a perspective view illustrating the application of the present method.
Figure 3:
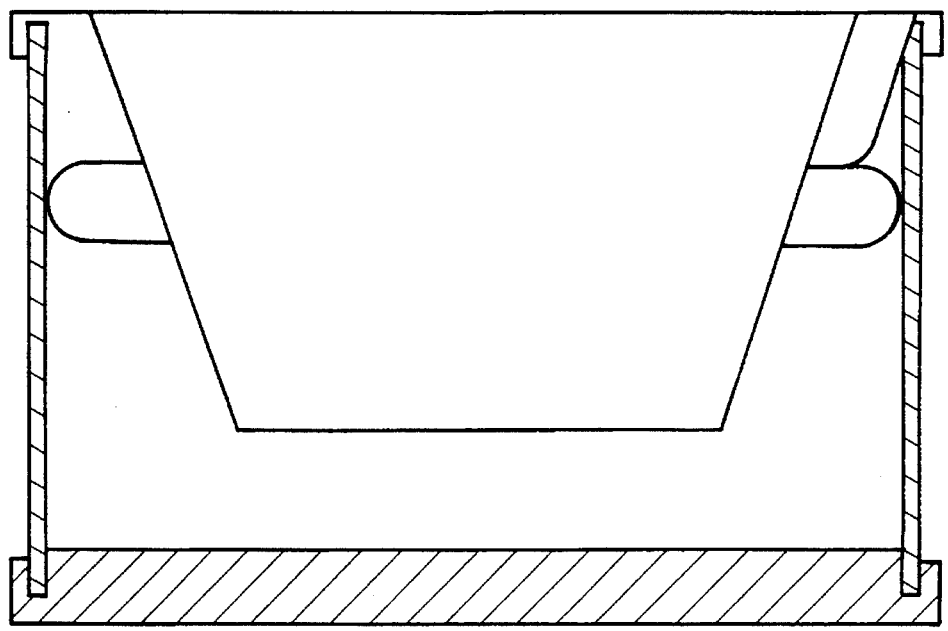
FIG. 3 is a cross sectional view illustrating another application of the present method.
Figure 4:
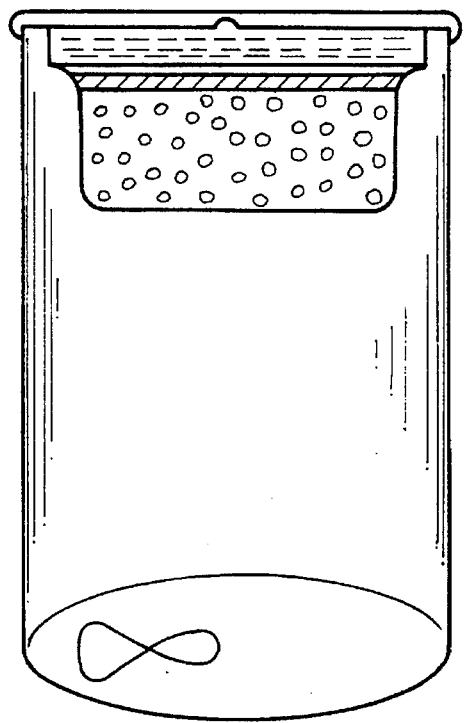
FIG. 4 is a schematic view illustrating still another application of the present method.

As shown in FIGS. 2 to 4, the heating material can be used to heat tea or coffee as shown in FIG. 2; or to cook the food contained in a cup as shown in FIG. 3; or to cook the canned food as shown in FIG. 4.

Accordingly, the method in accordance with the present invention includes two different heating materials for generating high temperature steam.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A method for utilizing heat energy generated from natural materials for cooking food, said method comprising:

preparing a first stone material including at least 55.5% of calcium oxide;

mixing said first stone material with sodium chloride and calcium chloride to form a first mixture, heating said first mixture from about 20° C. to about 1100° C. to form a slow heating material;

preparing a second stone material including at least 55.5% of calcium oxide;

mixing said second stone material with sodium chloride and calcium chloride to form a second mixture, heating said second mixture from about 200° C. to about 1300° C. to form a fast heating material;

mixing about 80% of said slow heating material and about 20% of said fast heating material to form a final heating material;

placing said final heating material in a first container;

mixing said final heating material with a predetermined amount of water sufficient to generate steam in said first container; and 2. A method for utilizing heat energy as claimed in claim 1, wherein about 88% of said first stone material, about 2% of sodium chloride and about 10% of calcium chloride are mixed to form said first mixture, and said first mixture is gradually heated from about 25° C. to about 1000° C. for about 25 minutes to form said slow heating material.

3. A method for utilizing heat energy as claimed in claim 1, wherein about 90% of said second stone material, about 3% of sodium chloride and about 7% of calcium chloride are mixed to form said second mixture, and said second mixture is gradually heated from about 250° C. to about 1250° C. for about 15 minutes to form said fast heating material.

4. A method for utilizing heat energy as claimed in claim 1, wherein the proportion of said final heating material to water is about 1:0.9.

* * * * *